United States Patent
Howard

(10) Patent No.: US 7,534,516 B2
(45) Date of Patent: May 19, 2009

(54) SOLID POLYMER MEMBRANE FOR FUEL CELL WITH POLYAMINE IMBIBED THEREIN FOR REDUCING METHANOL PERMEABILITY

(75) Inventor: Edward Howard, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1025 days.

(21) Appl. No.: 10/488,910

(22) PCT Filed: Oct. 15, 2002

(86) PCT No.: PCT/US02/32840

§ 371 (c)(1),
(2), (4) Date: Mar. 4, 2004

(87) PCT Pub. No.: WO03/034529

PCT Pub. Date: Apr. 24, 2003

(65) Prior Publication Data

US 2004/0241519 A1  Dec. 2, 2004

(51) Int. Cl.
    H01M 8/10 (2006.01)
(52) U.S. Cl. .......................... 429/33; 429/309; 429/317; 524/167; 524/413; 524/500
(58) Field of Classification Search .................. 429/33, 429/309, 317; 524/167, 413, 500
See application file for complete search history.

(56) References Cited

U.S. PATENT DOCUMENTS

| | | |
|---|---|---|
| 3,282,875 A | 11/1966 | Connolly et al. |
| 4,200,538 A | 4/1980 | Seita et al. |
| 4,358,545 A | 11/1982 | Ezzell et al. |
| 5,643,689 A | 7/1997 | Fleischer et al. |
| 5,672,438 A | 9/1997 | Banerjee et al. |
| 6,025,092 A | 2/2000 | Doyle et al. |
| 6,287,722 B1 | 9/2001 | Barton et al. |
| 7,332,530 B2 * | 2/2008 | Kiefer et al. .................. 521/27 |
| 2003/0219640 A1 * | 11/2003 | Nam et al. .................... 429/33 |

FOREIGN PATENT DOCUMENTS

EP   1 085 590 A1   3/2001

(Continued)

OTHER PUBLICATIONS

Baldauf et. al., Status of the Development of a Direct Methanol Fuel Cell, J. Power Sources, 1999, pp. 161-166, vol. 84.

(Continued)

Primary Examiner—Peter D. Mulcahy
Assistant Examiner—Henry Hu

(57) ABSTRACT

The present invention provides for a solid polymer electrolyte membrane having a fluorinated ionomer having imbibed therein a non-fluorinated, non-ionomeric polymer, wherein the fluorinated ionomer comprises at least 6 mole % of monomer units having a fluorinated pendant group with a terminal ionic group, and wherein the non-ionomeric polymer is selected from the group consisting of a polyamine, a polyvinyl amine, and derivatives thereof. The invention also provides a catalyst coated membrane and a fuel cell having this solid polymer electrolyte membrane.

9 Claims, 4 Drawing Sheets

FOREIGN PATENT DOCUMENTS

| | | | |
|---|---|---|---|
| EP | 1085590 A1 * | 3/2001 | |
| JP | 53 60388 | 5/1978 | |
| JP | 2001 85038 A | 3/2001 | |
| WO | WO 98/42037 A1 | 9/1998 | |
| WO | WO 99/52954 A1 | 10/1999 | |
| WO | WO 00/24709 A2 | 5/2000 | |
| WO | WO 00/77057 A2 | 12/2000 | |
| WO | WO 01/63683 A2 * | 8/2001 | |
| WO | WO-01/63683 A2 * | 8/2001 | |
| WO | WO-03/034529 A1 * | 4/2003 | |

OTHER PUBLICATIONS

Jia et. al., Modification of Nafion Proton Exchange Membranes to Reduce Methanol Crossover in Pem Fuel Cell, Electrochemical and Solid State Letters, 2000, pp. 529-531, vol. 3.

Takata et. al., Modification of Transport Properties of Ion Exchange Membranes XIV. Effect of Molecular Weight of Polyethyleneimine Bonded to the Surface of Cation Exchange Membranes by Acid—Amide Bonding on Electrochemical Properties of the Membranes, Journal of Membrane Science, 2000, pp. 101-107, vol. 179.

* cited by examiner

SOLID POLYMER MEMBRANE FOR FUEL CELL WITH POLYAMINE IMBIBED THEREIN FOR REDUCING METHANOL PERMEABILITY

FIELD OF THE INVENTION

The present invention relates for a direct methanol fuel cell that employs a solid polymer electrolyte membrane, and more particularly relates to certain solid polymer electrolyte membrane compositions.

BACKGROUND OF THE INVENTION

Direct methanol fuel cells (DMFCs), fuel cells in which the anode is fed directly with liquid or vaporous methanol, have been under development for a considerable period of time, and are well-known in the art. See for example Baldauf et al, *J. Power Sources*, vol. 84, (1999), Pages 161-166. One essential component in a direct methanol, or any, fuel cell is the separator membrane.

It has long been known in the art to form ionically conducting polymer electrolyte membranes and gels from organic polymers containing ionic pendant groups. Well-known so-called ionomer membranes in widespread commercial use are Nafion® perfluoroionomer membranes available from E. I. du Pont de Nemours and Company, Wilmington Del. Nafion® is formed by copolymerizing tetrafluoroethylene (TFE) with perfluoro(3,6-dioxa-4-methyl-7-octenesulfonyl fluoride), as disclosed in U.S. Pat. No. 3,282,875. Other well-known perfluoroionomer membranes are copolymers of TFE with perfluoro (3-oxa-4-pentene sulfonyl fluoride), as disclosed in U.S. Pat. No. 4,358,545. The copolymers so formed are converted to the ionomeric form by hydrolysis, typically by exposure to an appropriate aqueous base, as disclosed in U.S. Pat. No. 3,282,875. Lithium, sodium and potassium are all well known in the art as suitable cations for the above cited ionomers.

Other fluorinated ionomer membranes are known in the art such as those described in WO 9952954, WO 0024709, WO 0077057, and U.S. Pat. No. 6,025,092.

DMFCs employing ionomeric polymer electrolyte membranes as separators are known to exhibit high methanol cross-over—the transport of as much as 40% of the methanol from the anode to the cathode by diffusion through the membrane. This methanol cross-over essentially represents a fuel leak, greatly decreasing the efficiency of the fuel cell. In addition, the presence of methanol at the cathode interferes with the cathode reaction, with the methanol itself undergoing oxidation, and, in sufficient volume, floods the cathode and shuts down the fuel cell altogether. Methanol cross-over occurs primarily as a result of the high solubility of methanol in the ionomeric membranes of the art.

It is of considerable interest in the art to identify ways to reduce methanol cross-over in ionomeric membranes while entailing as small as possible cost in conductivity.

Kyota et al, JP Sho 53(1978)-60388, describes a process for producing modified Nafion® membranes with reduced permeability to hydroxide ion by swelling with a solvent or liquid, diffusing a polymerizable vinyl monomer into the swollen matrix with an initiator, and polymerizing in situ. Also disclosed by reference is a process for diffusing the monomers without solvent-swelling, but the solvent-swelling process is said to be superior. Methanol permeability is not discussed.

Seita et al, U.S. Pat. No. 4,200,538, disclose a cation exchange membrane prepared by swelling a fluorinated ionomer with an organic solvent, removing the solvent, immersing in a vinyl monomer, adding initiators and other additives, and polymerizing the monomer in situ. Improvements in hydroxyl ion permeability are noted. Suitable monomers include styrene and styrene derivatives; acrylic, methacrylic, and maleic acids and salts and esters thereof; vinyl acetate, vinyl isocyanate, acrylonitrile, acrolein, vinyl chloride, vinylidene chloride, vinylidene fluoride, vinyl fluoride; and numerous others. Methanol permeability is not discussed.

Fleischer et al, U.S. Pat. No. 5,643,689, disclose composite membranes which include combination of ionomeric polymers and numerous non-ionic polymers including polythyleneimine and polyvinylpyrrolidone. Metal oxides are present in the composite. The composites are prepared by dissolving the respective polymers in a common solvent and then removing the solvent, and are said to be useful in hydrogen fuel cells.

Li et al, WO 98/42037, discloses polymer electrolyte blends in batteries. Disclosed are blends of polybenzimidazoles with Nafion® and other polymers in concentration ratios of ca. 1:1. Preferred are blends of polybenzimidazoles and polyacrylamides. Polyvinylpyrrolidone and polyethyleneimine are also disclosed.

SUMMARY OF THE INVENTION

In a first aspect, the invention provides a solid polymer electrolyte membrane comprising a fluorinated ionomer having imbibed therein a non-fluorinated, non-ionomeric polymer, wherein the fluorinated ionomer comprises at least 6 mole % of monomer units having a fluorinated pendant group with a terminal ionic group, and wherein the non-ionomeric polymer is selected from the group consisting of a polyamine, a polyvinylamine, and derivatives thereof.

In the first aspect, the polyamine is selected from the group consisting of polyvinylpyrrolidone and polyethyleneimine.

In a second aspect, the invention provides a catalyst coated membrane comprising a solid polymer electrolyte membrane having a first surface and a second surface, an anode present on the first surface of the solid polymer electrolyte membrane, and a cathode present on the second surface of the solid polymer electrolyte membrane, wherein the solid polymer electrolyte membrane comprises a fluorinated ionomer having imbibed therein a non-fluorinated, non-ionomeric polymer, wherein the fluorinated ionomer comprises at least 6 mole % of monomer units having a fluorinated pendant group with a terminal ionic group, and wherein the non-ionomeric polymer is selected from the group consisting of a polyamine, a polyvinyl amine, and derivatives thereof.

In the second aspect, the polyamine is selected from the group consisting of polyvinylpyrrolidone and polyethyleneimine.

In a third aspect, the invention provides a fuel cell comprising a solid polymer electrolyte membrane, wherein the solid polymer electrolyte membrane comprises a fluorinated ionomer having imbibed therein a non-fluorinated, non-ionomeric polymer, wherein the fluorinated ionomer comprises at least 6 mole % of monomer units having a fluorinated pendant group with a terminal ionic group, and wherein the non-ionomeric polymer is selected from the group consisting of a polyamine, a polyvinyl amine, and derivatives thereof.

In the third aspect, the polyamine is selected from the group consisting of polyvinylpyrrolidone and polyethyleneimine.

In the third aspect, the fuel cell further comprises an anode and a cathode present on the first and second surfaces of the polymer electrolyte membrane.

In the third aspect, the fuel cell further comprises a means for delivering fuel to the anode, a means for delivering oxygen to the cathode, a means for connecting the anode and cathode to an external electrical load, methanol in the liquid or gaseous state in contact with the anode, and oxygen in contact with the cathode. The fuel is in the liquid or vapor phase. Some suitable fuels include alcohols such as methanol and ethanol; ethers such as diethyl ether, etc.

DETAILED DESCRIPTION

Figure 1:
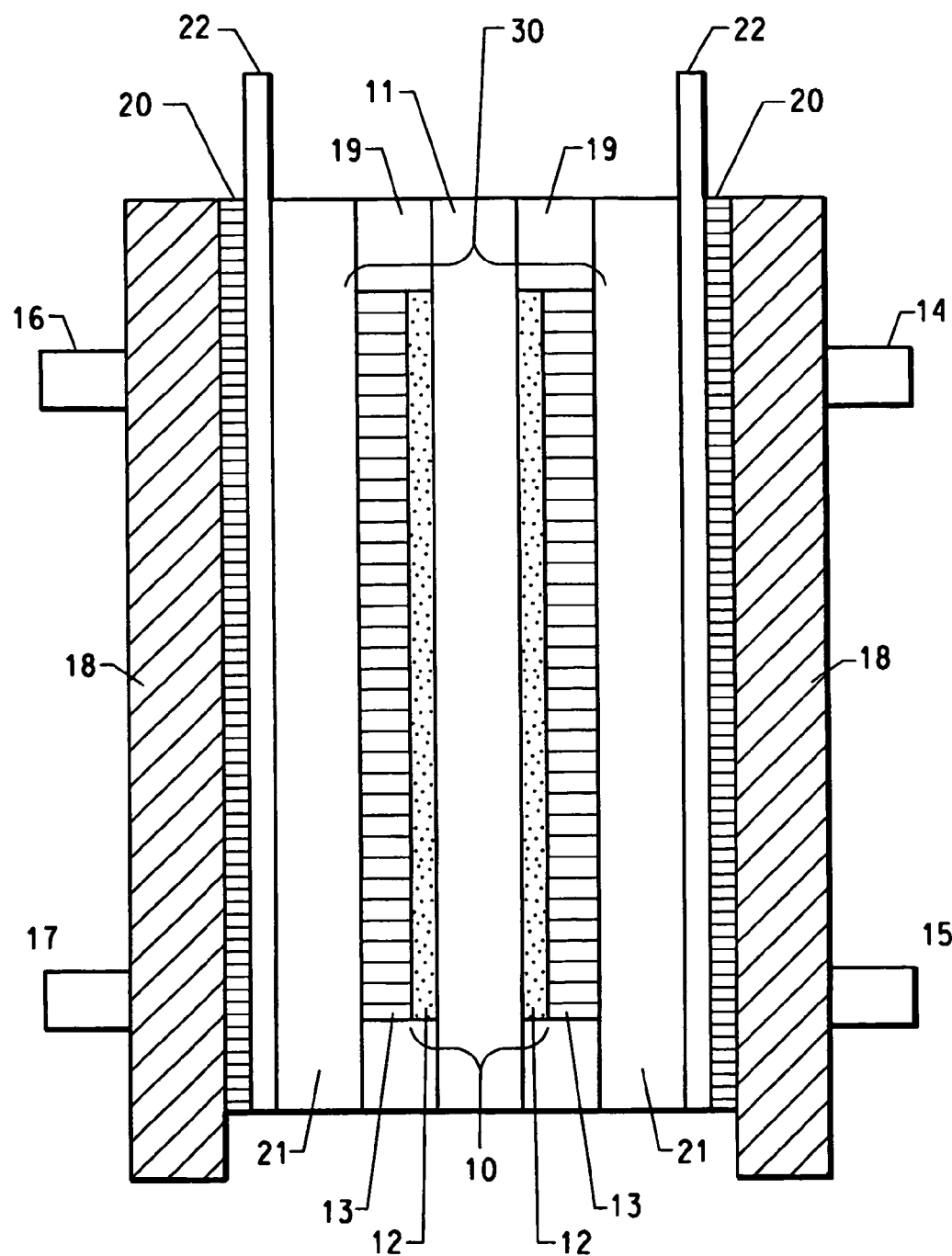
FIG. 1 is a schematic illustration of a single cell assembly.

Following the practice of the art, in the present invention, the term "ionomer" is used to refer to a polymeric material having a pendant group with a terminal ionic group. The terminal ionic group may be an acid or a salt thereof as might be encountered in an intermediate stage of fabrication or production of a fuel cell. Proper operation of the fuel cell of the invention requires that the ionomer be in acid form. The term "polymeric precursor" to an ionomer suitable for use in the present invention refers to the non-ionic form of a polymer which when subject to hydrolysis according to well-known methods in the art is converted into the ionomer suitable for use in the present invention, or a salt thereof.

Also for the purposes of the present invention the term "polyamine" refers to polymers having an amine functionality in the monomer unit, either incorporated into the backbone, as in polyalkyleneimines, or in a pendant group as in polyvinyl amines. The term "polyamine" will be employed to encompass polymers variously known as polyamines, polyamides, polyimines, polyimides, and polyvinyl amines, amides, imines, and imides. By "derivatives thereof" we mean

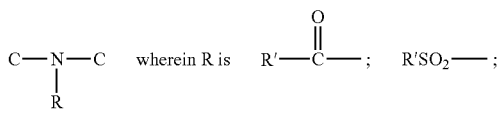

wherein R or R' is alkyl of 1 to 16 carbon atoms, more typically 1 to 5 carbon atoms, and aryl of 6-20 carbon atoms, more typically 6 to 8 carbon atoms.

The term "membrane precursor" refers to a membrane formed from the ionomer suitable for the practice of the invention, prior to the formation of a blend with another polymer which is not an ionomer in order to produce the composite ionomeric polymer electrolyte membrane of the invention. It is not necessary for the practice of the invention that a precursor membrane first be formed followed by incorporation of a polymer which is not an ionomer to form the composite membrane of the invention. For example, it is possible in some cases to melt blend the ionomeric precursor and the polymer which is not an ionomer followed by melt casting a film and hydrolysis. In other cases, it is possible to dissolve the ionomer or its precursor and the other polymer which is not an ionomer in a common solvent, and then solution cast a film. However, it is found in the practice of the invention that it is convenient to first fabricate a membrane precursor from the ionomer or its precursor followed by imbibing the non-fluorinated, non-ionomeric polymer therein.

It is found that the polymer electrolyte membrane comprising a fluorinated ionomer having imbibed therein another polymer which is not an ionomer provides a reduction in methanol and water permeability at relatively modest cost, if any, in conductivity to provide an improved DMFC.

A membrane comprising a fluorinated ionomer having imbibed therein a polyamine has utility in electrochemical cells with particular utility in DMFCs. One of ordinary skill in the art will understand that the film or sheet structure will have utility in packaging, in non-electrochemical membrane applications, as an adhesive or other functional layer in a multilayer film or sheet structure, and other classic applications for polymer films and sheets which are outside electrochemistry. For the purposes of the present invention, the term "membrane," a term of art in common use in the fuel cell art is synonymous with the terms "film" or "sheet" which are terms of art in more general usage but refer to the same articles.

Membrane:

Ionomers suitable for use in the present invention comprise at least 6 mol % of monomer units having a fluorinated pendant group with a terminal ionic group, preferably a sulfonic acid or sulfonate salt. A "polymeric precursor" to an ionomer suitable for use in the present invention preferably comprises a sulfonyl fluoride end-group, which when subject to hydrolysis under alkaline conditions, according to well-known methods in the art, is converted into a sulfonic acid or sulfonate salt.

Any direct methanol fuel cell known in the art, of the type provided with an ionomeric polymer electrolyte membrane may be employed in the present invention. It is by the substitution of a membrane comprising a fluorinated ionomer having imbibed therein a polymer which is not a fluorinated ionomer, according to the teachings of the present invention, for the ionomeric membrane of the art that the benefits of the present invention are realized.

It has been found that solid polymer electrolyte membranes of the invention that are particularly well suited for use in fuel cells, and in particular direct methanol fuel cells, have a surprisingly large decrease in methanol permeability at a relatively small, if any, sacrifice in conductivity.

A membrane in accordance with the invention comprises an ionomeric polymer or ionomer, having imbibed therein a non-ionomeric polymer. The ionomer suitable for the practice of the invention has cation exchange groups that can transport protons across the membrane. The cation exchange groups are acids preferably selected from the group consisting of sulfonic, carboxylic, phosphonic, imide, methide, sulfonimide and sulfonamide groups. Various known cation exchange ionomers can be used including ionomeric derivatives of trifluoroethylene, tetrafluoroethylene, styrene-divinylbenzene, alpha, beta, beta-trifluorostyrene, etc., in which cation exchange groups have been introduced alpha, beta, beta-trifluorstyrene polymers useful for the practice of the invention are disclosed in U.S. Pat. No 5,422,411.

Ionomeric Polymers:

In one embodiment of the invention, the ionomer comprises a polymer backbone and recurring side chains attached to the backbone with the side chains carrying the cation exchange groups. For example, ionomers are formed by copolymerization of a first fluorinated vinyl monomer and a second fluorinated vinyl monomer having a side cation exchange group or a fluorinated cation exchange group precursor (e.g., SO$_2$F) which can be subsequently hydrolyzed to sulfonic acid groups. Possible first monomers include but are not limited to tetrafluoroethylene, hexafluoropropylene, vinyl fluoride, vinylidine fluoride, trifluoroethylene, chlorotrifluoroethylene, perfluoro(alkyl vinyl ether), and mixtures thereof. Possible second monomers include but are not limited to a variety of fluorinated vinyl ethers with fluorinated cation exchange groups or precursor groups.

In a further embodiment, the ionomer in accordance with the invention has a backbone which is substantially fluorinated and the ion exchange groups are sulfonic acid groups or alkali metal or ammonium salts thereof which are readily converted to sulfonic acid groups by ion exchange. "Substantially fluorinated" means that at least 60% of the total number of halogen and hydrogen atoms are fluorine atoms. In a further embodiment, the ionomer backbone and the side chains are highly fluorinated, particularly perfluorinated. The term "highly fluorinated" means that at least 90% of the total number of halogen and hydrogen atoms are fluorine atoms.

Some ionomers suitable for use in the present invention are variously described in U.S. Pat. No. 4,358,545, U.S. Pat. No. 4,940,525, WO 9945048, U.S. Pat. No. 6025092. Suitable ionomers as disclosed therein comprise a highly fluorinated carbon backbone having at least 6 mol % of a perfluoroalkenyl monomer unit having a pendant group comprising the radical represented by the formula $$\text{—(OCF}_2\text{CFR)}_a\text{OCF}_2\text{(CFR')}_b\text{SO}_2\text{X}^-\text{(H}^+\text{)[YZ}_c]_d \quad \text{(I)}$$

wherein

R and R' are independently selected from F, Cl or a perfluoroalkyl group having 1 to 10 carbon atoms, optionally substituted by one or more ether oxygens;

a=0, 1 or 2;

b=0 to 6;

X is O, C or N with the proviso that d=0 when X is O and d=1 otherwise, and c=1 when X is C and c=0 when X is N;

when c=1, Y and Z are electron-withdrawing groups selected from the group consisting of CN, SO$_2$R$_f$, SO$_2$R$^3$, P(O)(OR$^3$)$_2$, CO$_2$R$^3$, P(O)R$^3$$_2$, C(O)R$_f$, C(O)R$^3$, and cycloalkenyl groups formed therewith wherein R$_f$ is a perfluoroalkyl group of 1-10 carbons optionally containing one or more ether oxygens; R$^3$ is an alkyl group of 1-6 carbons optionally substituted with one or more ether oxygens, or an aryl group optionally further substituted;

or, when c=0, Y may be an electron-withdrawing group represented by the formula —SO$_2$R$_f'$ where R$_f'$ is the radical represented by the formula

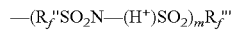

where m=0 or 1, and R$_f''$ is —C$_n$F$_{2n}$— and R$_f'''$ is —C$_n$F$_{2n+1}$ where n=1-10

Most preferably, the ionomer comprises a perfluorocarbon backbone and said pendant group is represented by the formula

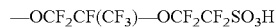

Ionomers of this type are disclosed in U.S. Pat. No. 3,282,875.

The equivalent weight (a term of the art defined herein to mean the weight of the ionomer in acid form required to neutralize one equivalent of NaOH) of the ionomer can be varied as desired for the particular application. Where the ionomer comprises a perfluorocarbon backbone and the side chain is represented by the formula

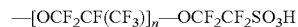

where n=0 or 1. The equivalent weight when n=1 is preferably 800-1500, most preferably 900-1200. The equivalent weight when n=0 is preferably 600-1300.

In the manufacture of the preferred membranes wherein the ionomer has a highly fluorinated backbone and sulfonate ion exchange groups, a membrane precursor is conveniently initially formed from the polymer in its sulfonyl fluoride form since it is thermoplastic and conventional techniques for making films from thermoplastic polymers can be used. Alternatively, the ionomer precursor may be in another thermoplastic form such as by having —SO$_2$X groups where X is alkoxy such as CH$_3$O— or C$_4$H$_9$O—, or an amine. Solution film casting techniques using suitable solvents for the particular polymer can also be used if desired.

The ionomer precursor polymer in sulfonyl fluoride form can be converted to the sulfonate form (i.e, ionic form) by hydrolysis using methods known in the art. For example, the membrane may be hydrolyzed to convert it to the sodium sulfonate form by immersing it in 25% by weight NaOH for about 16 hours at a temperature of about 90° C. followed by rinsing the film twice in deionized 90° C. water using about 30 to about 60 minutes per rinse. Another possible method employs an aqueous solution of 6-20% of an alkali metal hydroxide and 5-40% polar organic solvent such as dimethyl sulfoxide with a contact time of at least 5 minutes at 50-100° C. followed by rinsing for 10 minutes. After hydrolyzing, the membrane can be converted if desired to another ionic form by contacting the membrane in a bath containing a 1% salt solution containing the desired cation or, to the acid form, by contacting with an acid and rinsing. For fuel cell use, the membrane is usually in the sulfonic acid form.

If desired, the membrane precursor may be a laminated membrane of two or more ionomeric precursors such as two highly fluorinated ionomers having different ion exchange groups and/or different ion exchange capacities. Such membranes can be made by laminating films or co-extruding a multi-layer film. In addition, the ionomeric component of the composite membrane suitable for use in the present invention may be itself a blend of two or more ionomers such as two or more highly fluorinated ionomer preferred for the practice of the invention which have different ion exchange groups and/or different ion exchange capacities. It is also possible to form a multilayer structure incorporating one or more layers of the composite membrane of the invention.

The thickness of the membrane can be varied as desired for a particular electrochemical cell application. Typically, the thickness of the membrane is generally less than about 250 µm, preferably in the range of about 25 µm to about 150 µm.

The membrane may optionally include a porous support for the purposes of improving mechanical properties, for decreasing cost and/or other reasons. The porous support of the membrane may be made from a wide range of components. The porous support of the present invention may be made from a hydrocarbon such as a polyolefin, e.g., polyethylene, polypropylene, polybutylene, copolymers of those materials, and the like. Perhalogenated polymers such as polychlorotrifluoroethylene may also be used. For resistance to thermal and chemical degradation, the support preferably is made of a highly fluorinated polymer, most preferably perfluorinated polymer.

For example, the polymer for the porous support can be a microporous film of polytetrafluoroethylene (PTFE) or acopolymer of tetrafluoroethylene with other perfluoroalkyl olefins or with perfluorovinyl ethers. Microporous PTFE films and sheeting are known which are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids.

Alternatively, the porous support may be a fabric made from fibers of the support polymers discussed above woven using various weaves such as the plain weave, basket weave, leno weave, or others. A membrane suitable for the practice of the invention can be made by coating the porous support fabric with an ionomeric polymer having imbibed therein a non-ionomeric polymer to form a composite membrane of the invention in situ on the porous support. To be effective the coating must be on both the outside surfaces as well as distributed through the internal pores of the support. This may be accomplished by impregnating the porous support with a solution or dispersion of the blend of ionomeric and non-ionomeric polymers suitable for the practice of the invention using a solvent which is not harmful to the polymer of the support under the impregnation conditions and which can form a thin, even coating of the composite blend on the support. The support with the solution/dispersion is dried to form the membrane. If desired, thin films of the ion exchange polymer can be laminated to one or both sides of the impregnated porous support to prevent bulk flow through the membrane that can occur if large pores remain in the membrane after impregnation.

It is preferred for the cation exchange ionomer to be present as a continuous phase within the membrane.

Other forms of the solid polymer electrolyte membrane include the PTFE yarn embedded type and the PTFE fibril dispersed type, wherein the PTFE fibril is dispersed in the ion exchange resin as disclosed in 2000 Fuel Cell Seminar (10/30 to 11/2, 2000, Portland, Oreg.) Abstracts, p-23.

Non-Fluorinated, Non-Ionomeric Polymers and Formation of Membranes:

The membrane composition further comprises a non-fluorinated, non-ionomeric polymer. The selection of non-ionomeric polymers suitable for use in the polymer electrolyte membrane is quite wide. It is desirable that the second polymer be chemically and thermally stable under conditions of use in a fuel cell. It is preferred that the second polymer may comprise a relatively high frequency of dipolar monomer units but is not itself ionic. A "high frequency" of dipolar monomer units means that the mole percentage concentration of monomer units having dipolar functionality should be at least 75%, and is preferably greater than 90%. A "high frequency" of dipolar monomer units also means that the monomer units of which the dipolar moiety is a part should be as short as possible to increase the frequency of occurrence of the dipolar moiety. Thus a vinyl monomer would be preferred over, for example a butenyl monomer.

The non-ionomeric polymer may be dissolved to form a solution in a solvent that is also a swelling agent for the ionomer that is also prepared separately. In a preferred embodiment, a polyamine, most preferably polyvinylpyrrolidone or polyethyleneimine, is dissolved in a solvent in which the ionomer is also swollen. A preferred solvent is a mixture of tetrahydrofuran (THF) and water. In the preferred embodiment, the polyamine is dissolved in the THF/$H_2O$ mixture, then a preformed membrane of the ionomer is immersed in the solution for a period of up to several hours in order to achieve the desired level of non-ionomeric polymer in the ionomer.

When prepared according to the methods taught herein, the non-ionomeric polymer is usually well dispersed in the ionomer or polymeric precursor thereto. It has been observed in the practice of the invention that polyamine concentrations of as little as about 0.2% by weight, more typically as little as about 1% by weight, based on the weight of the solid polymer electrolyte membrane, can provide significant reductions in methanol permeability while maintaining conductivity at a high level. Polyamines may be used in concentrations that do not deleteriously affect the membrane. For example, up to about 50% of the polyamine concentration may be used, more typically about 1 to about 10%.

One of skill in the art will recognize that the polymer electrolyte membrane compositions of the invention wherein the membrane comprises polyamine will have utility in hydrogen fuel cells, including reformed hydrogen fuel cells, as well as in direct methanol fuel cells. Hydrogen fuel cells are well known in the art. Use of the ionomeric polymer membrane comprising polyamine is contemplated in any or all hydrogen fuel cell designs. The specific design of and materials suitable for hydrogen fuel cells are largely encompassed by the following discussion that is primarily aimed at direct methanol fuel cells. That is to say, a hydrogen fuel cell must have an anode, a cathode, a separator, an electrolyte, a hydrogen feed, an oxygen feed, a means for connecting to the outside, and such other components as are indicated in FIG. 1 with the substitution of hydrogen for methanol. One of ordinary skill will recognize that for the purpose of the present invention, a hydrogen fuel cell includes a reformed hydrogen fuel cell.

Membrane Electrode Assemblies (MEAs) and Electrochemical Cells

One embodiment of a fuel cell suitable for the practice of the present invention is shown in FIG. 1. While the cell depicted represents a single-cell assembly such as that employed in determining some of the results herein, one of skill in the art will recognize that all of the essential elements of a direct methanol fuel cell are shown therein in schematic form.

A ionomeric polymer electrolyte membrane of the invention, 11, is used to form a membrane electrode assembly, 30, (MEA) by combining it with a catalyst layer, 12, comprising a catalyst, e.g. platinum, unsupported or supported on carbon particles, a binder such as Nafion®, and a gas diffusion backing, 13. The ionomeric polymer electrolyte membrane of the invention, 11, with a catalyst layer, 12, forms a catalyst coated membrane, 10, (CCM). The gas diffusion backing may comprise carbon paper which may be treated with a fluoropolymer and/or coated with a gas diffusion layer comprising carbon particles and a polymeric binder to form an membrane electrode assembly (MEA). The fuel cell is further provided with an inlet, 14, for fuel, such as liquid or gaseous alcohols, e.g. methanol and ethanol; or ethers such as diethyl ether, etc., an anode outlet, 15, a cathode gas inlet, 16, a cathode gas outlet, 17, aluminum end blocks, 18, tied together with tie rods (not shown), a gasket for sealing, 19, an electrically insulating layer, 20, and graphite current collector blocks with flow fields for gas distribution, 21, and gold plated current collectors, 22.

The fuel cell utilizes a fuel source that may be in the liquid or gaseous phase, and may comprise an alcohol or ether. Typically a methanol/water solution is supplied to the anode compartment and air or oxygen supplied to the cathode compartment. The ionomeric polymer electrolyte membrane serves as an electrolyte for proton exchange and separates the anode compartment from the cathode compartment. A porous anode current collector, and a porous cathode current collector are provided to conduct current from the cell. A catalyst layer that functions as the cathode is in contact with and between the cathode-facing surface of the membrane and the cathode current collector. A catalyst layer that functions as the anode is disposed between and is in contact with the anode-facing surface of the membrane and anode current collector. The cathode current collector is electrically connected to a positive terminal and the anode current collector is electrically connected to a negative terminal.

The catalyst layers may be made from well-known electrically conductive, catalytically active particles or materials and may be made by methods well known in the art. The catalyst layer may be formed as a film of a polymer that serves as a binder for the catalyst particles. The binder polymer can be a hydrophobic polymer, a hydrophilic polymer or a mixture of such polymers. Preferably, the binder polymer is an ionomer and most preferably is the same ionomer as in the membrane.

For example, in a catalyst layer using a perfluorinated sulfonic acid polymer membrane and a platinum catalyst, the binder polymer can also be perfluorinated sulfonic acid polymer and the catalyst can be a platinum catalyst supported on carbon particles. In the catalyst layers, the particles are typically dispersed uniformly in the polymer to assure that a uniform and controlled depth of the catalyst is maintained, preferably at a high volume density. It is typical that the particles be in contact with adjacent particles to form a low resistance conductive path through catalyst layer. The connectivity of the catalyst particles provides the pathway for electronic conduction and the network formed by the binder ionomer provides the pathway for proton conduction.

The catalyst layers formed on the membrane should be porous so that they are readily permeable to the gases/liquids that are consumed and produced in cell. The average pore diameter is preferably in the range of about 0.01 to about 50 μm, most preferably about 0.1 to about 30 μm. The porosity is generally in a range of about 10 to about 99%, preferably about 10 to about 60%.

The catalyst layers are preferably formed using an "ink", i.e., a solution of the binder polymer and the catalyst particles, which is used to apply a coating to the membrane. The binder polymer may be in the ionomeric (proton) form or in the sulfonyl fluoride (precursor) form. When the binder polymer is in the proton form the preferred solvent is a mixture of water and alcohol. When the binder polymer is in the precursor form the preferred solvent is a perfluorinated solvent (FC-40 made by 3M).

The viscosity of the ink (when the binder is in the proton form) is preferably controlled in a range of 1 to 102 poises especially about 102 poises before printing. The viscosity may be controlled by:

(i) particle size selection,
(ii) the composition of the catalytically active particles and binder,
(iii) adjusting the water content (if present), or
(iv) preferably by incorporating a viscosity regulating agent such as carboxymethyl cellulose, methyl cellulose, hydroxyethyl cellulose, and cellulose and polyethyleneglycol, polyvinyl alcohol, polyvinyl pyrrolidone, sodium polyacrylate and polymethyl vinyl ether.

The area of the membrane to be coated with the ink may be the entire area or only a select portion of the surface of the membrane. The catalyst ink may be deposited upon the surface of the membrane by any suitable technique including spreading it with a knife or blade, brushing, pouring, metering bars, spraying and the like. The catalyst layer may also be applied by decal transfer, screen printing, pad printing or by application from a printing plate, such as a flexographic printing plate.

If desired, the coatings are built up to the thickness desired by repetitive application. The desired loading of catalyst upon the membrane can be predetermined, and the specific amount of catalyst material can be deposited upon the surface of the membrane so that no excess catalyst is applied. The catalyst particles are preferably deposited upon the surface of a membrane in a range from about 0.2 mg/cm$^2$ to about 20 mg/cm$^2$.

Typically a screen printing process is used for applying the catalyst layers to the membrane with a screen having a mesh number of about 10 to about 2400, more typically a mesh number of about 50 to about 1000, and a thickness in the range of about 1 to about 500 micrometers. The mesh and the thickness of the screen, and viscosity of the ink are selected to give electrode thickness ranging from about 1 micron to about 50 microns, more particularly about 5 microns to about 15 microns. The screen printing process can be repeated as needed to apply the desired thickness. Two to four passes, usually three passes, have been observed to produce the optimum performance. After each application of the ink, the solvent is preferably removed by warming the electrode layer to about 50° C. to about 140° C., preferably about 75° C. A screen mask is used for forming an electrode layer having a desired size and configuration on the surface of the ion exchange membrane. The configuration is preferably a printed pattern matching the configuration of the electrode. The substances for the screen and the screen mask can be any materials having satisfactory strength such as stainless steel, poly(ethylene terephthalate) and nylon for the screen and epoxy resins for the screen mask.

After forming the catalyst coating, it is preferable to fix the ink on the surface of the membrane so that a strongly bonded structure of the electrode layer and the cation exchange membrane can be obtained. The ink may be fixed upon the surface of the membrane by any one or a combination of pressure, heat, adhesive, binder, solvent, electrostatic, and the like. Typically the ink is fixed upon the surface of the membrane by using pressure, heat or a combination of pressure and heat. The electrode layer is preferably pressed onto the surface of the membrane at about 100° C. to about 300° C., most typically about 150° C. to about 280° C., under a pressure of about 510 to about 51,000 kPa (about 5 to about 500 ATM), most typically about 1,015 to about 10,500 kPa (about 10 to about 100 ATM).

An alternative to applying the catalyst layer directly onto the membrane is the so-called "decal" process. In this process, the catalyst ink is coated, painted, sprayed or screen printed onto a substrate and the solvent is removed. The resulting "decal" is then subsequently transferred from the substrate to the membrane surface and bonded, typically by the application of heat and pressure.

When the binder polymer in the ink is in the precursor (sulfonyl fluoride) form, the catalyst coating after it is affixed to the membrane, either by direct coating or by decal transfer, is subjected to a chemical treatment (hydrolysis) where the binder is converted to the proton (or ionomeric) form.

The invention is illustrated in the following examples.

EXAMPLES

Methanol Permeability:

In order to determine methanol permeability, the membrane samples were loaded into a Millipore high-pressure filter assembly modified by the addition of liquid distribution plates to serve as a permeation test cell having a permeation area of 9.6 cm². The cell was then installed inside an insulated box kept at 80° C.

A methanol solution, typically about 1M to about 3M, was circulated on the top side of the membrane at a flow rate of 5.7 cc/min (measured with a rotameter). The bottom of the membrane was swept with nitrogen at 3,000 SCCM measured with mass flow controllers. Both the methanol solution and the nitrogen were heated to the cell temperature by circulating through stainless steel coils before entering the permeation cells. Samples of the nitrogen sweeping the permeation cells were directed to a set of Valco valves and then injected into a HP 6890 Gas Chromatograph with a Thermal Conductivity Detector (TCD) and HP-PLOT Q GC Column to determine methanol concentration. The molar flux of methanol through the membrane was calculated.

Conductivity of the subject membrane was determined by impedance spectroscopy by which is measured the ohmic (real) and capacitive (imaginary) components of the membrane impedance. Impedance was determined using the Solartron model SI 1260 Impedance/Gain-phase Analyzer, manufactured by Schlumberger Technologies Ltd., Instrument Division, Farnborough, Hampshire, England, utilizing a conductivity cell having a cell constant of 202.09, as described in *J. Phys. Chem.*, 1991, 95, 6040 and available from Fuel Cell Technologies, Albuquerque, N.Mex.

Prior to the conductivity measurement, a membrane was boiled in deionized water for one hour prior to testing. The conductivity cell was submersed in water at 25±1° C. during the experiment.

The impedance spectrum was determined from 10 Hz to $10^5$ Hz at 0 VDC, and 100 mv (rms) AC. The real impedance that corresponded to the highest (least negative) imaginary impedance was determined.

Conductivity was calculated from the equation:

conductivity=cell constant/[(real impedance)*(film thickness)]

Example 1

Preparation of Nafion® 117/Polyyinvlpyrrolidone (PVP) Membranes

To a solution of 10 g PVP (mol. wt. 29,000) in 25 ml $H_2O$ was added 25 ml tetrahydrofuran (THF). This caused phase separation. The upper layer (13 ml) contained THF, water and 0.13 g PVP. The lower layer was added to a 6 inch×6 inch× 0.007 inch (15.25 cm×15.25 cm×0.0178 cm) (8.54 g) Nafion® film in a 1 gallon size polyethylene zip-lock bag. After standing 3 days at room temperature, the film, when wiped dry, weighed 17 9, and 11.25 g when air dried. The film was extracted exhaustively with water with a final 3 hrs in 90° C. water. The extracted film weighed 12.49 g. The methanol permeability was below the threshold of detectability. The conductivity was 0.0183 S/cm.

Examples 2-4 and Comparative Example A

PVP (mol. wt. 29,000) in the amounts shown in Table 2 was dissolved in 50 ml $H_2O$, then 44 g of THF were added. There were no phase separations. Film specimens of Nafion® 117 approximately 6"×6"×0.007" (15.25 cm×15.25 cm×0.0178 cm) in size were soaked in the solutions for the times indicated, air dried, and water extracted as in Example 1. A control specimen was soaked in the THF/$H_2O$ solution without PVP, then water extracted as in Example 1. Results are shown in Table 2.

TABLE 2

|  | Example A (Control) | Example 2 | Example 3 | Example 4 |
|---|---|---|---|---|
| Weight PVP in solution | 0 | 0.63 | 1.25 | 2.5 |
| Weight of Nafion ® 117 | 8.36 | 8.11 | 7.84 | 8.10 |
| Hours of Soaking | 3 | 5 | 5 | 2 |
| Weight of Extracted Film | 11.85 | 11.88 | 11.65 | 11.84 |
| Methanol Permeability (mol/cm²/min × $10^5$) | 1.29 | 0.347 | 0.135 | .0943 |
| Conductivity (S/cm) | 0.0953 | 0.0796 | 0.07 | 0.0576 |
| % change in permeability | — | −73 | −90 | −93 |
| % Change in conductivity | — | −16 | −27 | −40 |

Examples 5-7

Following the procedures of Examples 2-4, polyethyleneimine (PEI) in the amounts shown in Table 3 was dissolved in 50 ml $H_2O$ after which 44 g of THF were added to give a clear solution. The Nafion(® 117 films approximately 6"×6"×0.007" (15.25 cm×15.25 cm×0.0178 cm) in size were soaked in the solutions for the indicated times, air dried, and water extracted as summarized in Table 3.

TABLE 3

|  | Example A (Control) | Example 5 | Example 6 | Example 7 |
|---|---|---|---|---|
| Weight PEI in solution | 0 | 0.68 | 0.34 | 0.24 |
| Weight of Nafion ® 117 | 8.36 | 7.97 | 7.9 | 8.07 |
| Hours of Soaking | 3 | 2 | 2 | 2 |
| Weight of Extracted Film | 11.85 | 10.33 | 10.36 | 9.80 |
| Methanol Permeability (mol/cm²/min × $10^5$) | 1.29 | 0.121 | 0.0956 | 0.0011 |
| Conductivity (S/cm) | 0.0953 | 0.0724 | 0.0787 | 0.0791 |
| % change in permeability | — | −91 | −93 | −99.9 |
| % Change in conductivity | — | −24 | −17 | −17 |

Example 8

Nafion® 117 film was dried at 185° C. and weighed. It had a weight of 8.06 g. It was then soaked in 29% aqueous solution of PVP (Alfa Aesar) for 3 days. The film was removed, wiped and dried at 30° C., followed by drying at 185° C., and then weighed again to show a weight of 8.17 g. The weight increase of 0.11 g by weight corresponded to a concentration of 1.3% of PVP in the membrane. Conductivity was 0.0956 S/cm, and methanol permeability was $1.06 \times 10^{-5}$ mol/cm²/ min.

Example 9

A 6 inch×6 inch×0.007 inch (15.25 cm×15.25 cm×0.0178 cm) specimen of Nafion®117 film was dried at 185° C., and weighed. It had a weight of 7.81 g. The film was then soaked in 10% PEI (Aldrich, MW 24,000) water solution for five hours. After removal, the film was wiped, and dried at 150° C. The dried film was soaked in water for 1 hour, dried again, and weighed to show a weight of 7.94 g. The weight difference indicated a concentration of PEI in the membrane so formed of 1.7%.

Example 10

The procedures of Example 9 were followed with the exception that the film was held clamped while one side of the film was painted with the PEI solution. The percentage of PEI in the final product was 0.64%. Conductivity was 0.093 S/cm, while methanol permeability was $1.22 \times 10^{-5}$ mol/cm²/min. By contrast, a Nafion®117 control specimen which was treated in a similar manner but without the PEI exhibited methanol permeability of $2.15 \times 10^{-5}$ mol/cm²/min.

Example 11

The procedure of Example 10 was repeated except that both sides of the film were painted. Conductivity was 0.094 S/cm, and methanol permeability was 0.882 mol/cm²/min.

Example 12

Permanence of Polyvinylpyrrolidone (PVP) Absorbed into Nafion®

The purpose of these experiments was to prove that PVP was irreversibly absorbed by the Nafion®.

A. Absorption of PVP into Nafion®

The film was prepared as described in Example 4, cut into pieces and treated as follows:

| Film Sample # | Treatment |
|---|---|
| 83-4 | Untreated |
| 83-5 | Heated at 175° C. for 20 min |
| 83-6 | Heated at 30° C. for 2 hrs in 20% aqueous NaOH; and water washed. |
| 83-7 | Sample 83-6 is heated at 75° C. for 1 hr in 20% HNO₃ (aqueous); and water washed |

All samples had strong carbonyl absorption at 1640 cm⁻¹ Neat polyvinylpyrrolidone had a strong carbonyl band at 1655 cm⁻¹ This band in the treated film had been shifted by the Nafion® by 15 cm⁻¹ indicating an association between the two polymers.

To see if any of the PVP had been extracted out of the Nafion®, the 1640 cm⁻¹ band of the absorbed PVP was compared with the 975 cm⁻¹ band of Nafion®. The data shown in Table 4 suggested that very little, if any, PVP was extracted.

TABLE 4

IR absorbancies of PVP/Nafion ® films

| Sample # | Absorbancy of 1640 cm⁻¹ / Absorbancy of 975 cm⁻¹ |
|---|---|
| 83-4 (untreated) | 1.05 |
| 83-5 | 0.76 |
| 83-6 | 1.35 |
| 83-7 | 0.95 |

The PVP/Nafion® ratio changed very little when treated with hot strong base and acid.

Example 13

These experiments show the effect molecular weight of PVP plays in Nafion® conductivity and water and methanol transport.

Nafion®117 film, 12 inch×6 inch×0.007 inch (30.5 cm×15.25 cm×0.0178 cm) specimens, were soaked in solutions of PVP dissolved in approximately 190 g of 50/44 water/THF (by weight) contained in sealed polyethylene bags. The bags were kneaded and turned over periodically to insure uniform reaction between the Nafion® and PVP. The films swelled unequally in the film cast direction, and shrunk in the perpendicular direction. After four hours, the films were measured, weighed wet, dried, measured and weighed again. The films were soaked in deionized water for 3 days, weighed, and measured again. The films were cut into two essentially equal parts. One part was tested directly.

The other part was treated sequentially with base and acid as described below:

The films from above were treated with 20% NaOH at 80-90° C. for 2 hours followed by 3 days of soaking in water. The films were then treated with 20% HNO₃ (by volume of 70% HNO₃ and water) at 80° C., for 2 hrs. After a water wash the samples were submitted for testing.

The following table shows the molecular weight effect on the Nafion® films of this example that were treated with the PVP and heated with nitric acid and sodium hydroxide solutions. The data shows that all molecular weights are effective in lowering methanol and water transport through Nafion® and the highest molecular weight PVP has the least effect on conductivity.

Effect of PVP Molecular Weight and a HNO$_3$/NaOH
Post-Treatment of PVP Nafion ® Film

| | PVP | | Transport Rate | | Conduc. | HNO$_3$/NaOH Treatment | | | |
|---|---|---|---|---|---|---|---|---|---|
| | | | | | | | Trans. | Rate | Conduc. |
| Code | Mol. Wt. | mmols | CH$_3$OH* | H$_2$O** | mS/cm | Code | CH$_3$OH* | H$_2$O** | Ms/cm |
| 120-4 | 10,000 | 14.1 | 0.832 | 4.36 | 44.2 | 130-4 | 0.527 | 3.89 | 44.7 |
| 120-5 | 29,000 | 14.1 | 0.767 | 3.95 | 45.0 | 130-5 | 0.345 | 2.16 | 29.7 |
| 120-6 | 1.3 × 10$^{-6}$ | 14.1 | 1.47 | 3.07 | 70.3 | 130-6 | 0.745 | 4.36 | 104.1 |
| Nafion ® Control | N/A | N/A | 1.87 | 8.71 | 100 | | | | |

*×10$^{-5}$ mol/cm$^2$/min
**×10$^{-4}$ mol/cm$^2$/min

The next table shows how the amount of PVP effects the performance of the Nafion® treated film. From the data, we see that the conductivity decreases with the concentration of the PVP used, and at the same time transport of methanol and water are generally lowered as the amount of PVP was increased. It was remarkable that the acid/base treatment increased conductivity and lowered transport rates of methanol and water.

Effect of PVP Concentration On Performance of PVP/Nafion ® Films

| PVP | | | Transport Rate | | Conduc. | | Transport Rate | | Conduct. |
|---|---|---|---|---|---|---|---|---|---|
| | Mol. Wt. | | CH$_3$OH | H$_2$O | mS/cm | Code | CH$_3$OH | H$_2$O | mS/cm |
| 120-3 | 1.34 × 10$^6$ | 10.5 | 1.22 | 5.08 | 95.7 | 130-3 | 0.804 | 4.34 | 111.5 |
| 120-6 | 1.34 × 10$^6$ | 14.1 | 1.47 | 3.07 | 70.3 | 130-6 | 0.745 | 4.36 | 104.1 |
| 120-9 | 1.34 × 10$^6$ | 2.7 | 1.33 | 5.44 | 95.1 | 130-9 | 1.280 | 7.23 | 121.2 |

Example 14

Copolymer of vinyl pyrrolidone and 2-dimethylaminoethyl methacrylate, quaternized copolymer with Nafion® —SO$_3$H$^+$ form.

To the above polymer, as a 20% water solution (from Aldrich, average molecular weight less than one million), was added a 6"×6"×7 mil Nafion® 117 (—SO$_3$H$^+$ form) film, and the resulting film was dried at 180° C. After storing at room temperature for four days, the film was wiped dry, and dried at 50° C. The weight of the film had increased from 8.8 g to 9.3 g.

The film was then soaked in water for 2 hours and dried again at 80° C., to give a weight of 9.32 g. The film had the following properties:

| Permeability | |
|---|---|
| for CH$_3$OH | 3.83 × 10$^{-6}$ mol/cm$^2$/min |
| for H$_2$O | 2.15 × 10$^{-4}$ mol/cm$^2$/min |
| Conductivity | 0.0154 S/cm. |

The methanol and water permeation rates were lowered three fold.

Example 15

Polyacrylamide was Imbided into Nafion® Film.

A Nafion® —SO$_3$H$^+$ 12 inch×6 inch×0.007 inch (30.5 cm×15.25 cm×0.0178 cm) film was dried at 180° C., and soaked in 20% polyacrylamide in water (Aldrich) at room temperature for four days. The film was wiped dry with a moist towel, and dried at 150° C. Although there was not a measurable weight gain in the dried film, its properties were altered.

| Rate of permeation | |
|---|---|
| H$_2$O × 10$^{-4}$ mol/cm$^2$/min | 5.16 |
| CH$_3$OH × 10$^{-6}$ mol/cm$^2$/min | 9.83 |
| Conductivity mS/cm | 25 |

Example 16

In this example, only one side of the Nafion® film was treated with PVP.

The 12 inch×6 inch×0.007 inch (30.5 cm×15.25 cm×0.0178 cm) in size Nafion® —SO$_3$H$^+$ film was clamped to a 0.125 inch (0.318 cm) plaque of polytetrafluoroelthylene with book binder clips. Then the exposed side was treated with PVP solution used in Example 12. The film expanded by buckling, but the clips held the film in place and the solution did not touch the film's underside. The assembly was placed in a polyethylene bag so that the PVP solution would not dry. After 2 hours, the surface was sprayed lightly with a water mist and place back in the sealed bag with a wet paper towel to keep the humidity high for 3 days. The wet towel did not touch the film. The film was rinsed with water, soaked in water for 2 hours, and dried at 180° C.

Properties, as compared with those of Example 8 are shown below:

| Permeation of: | Nafion ® treated on one side | Nafion ® treated on both sides |
|---|---|---|
| $H_2O$ ($\times 10^{-4}$ mol./cm$^2$/min) | 5.64 | 5.82 |
| $CH_3OH$ ($\times 10^{-5}$ mol/cm$^2$/min) | 1.19 | 1.00 |
| Conductivity (S/cm) | 0.0932 | 0.0956 |

Example 17

A copolymer of N-vinyl pyrrolidone and vinylacetate was imbided into a 12 inch×6 inch×0.007 inch (30.5 cm×15.25 cm×0.0178 cm) in size Nafion® —SO$_3$H$^+$ film.

A solution of the copolymer of 60% viny pyrrolidone and 40% vinylacetate (Aldrich) in methanol was used to imbibe the copolymer into the Nafion® —SO$_3$H$^+$ film. After 2 hours, the film was removed, dried with paper towels, followed by methanol wet towels until the surface was cleaned of polymer, and dried at 80° C. Results are shown below:

| Permeation | |
|---|---|
| $H_2O$ ($\times 10^{-4}$ mol/cm$^2$/min) | 5.230 |
| $CH_3OH$ ($\times 10^{-5}$ mol/cm$^2$/min) | 0.983 |
| Conductivity, mS/cm | 81 |

Example 18: (Control)

In this example, a non-polymeric pyrrolidone (N-methylpyrrolidone) was tested. It did nothing to lower water on methanol transport.

A 12 inch×6 inch×0.007 inch (30.5 cm×15.25 cm×0.0178 cm) in size Nafion® —SO$_3$H$^+$ film was dried at 180° C., was stored in 30% N-methylpyrrolidone (NMP) for two hours. The film was soaked in water for 3 days and finally dried at 185° C. Results are shown in the table below:

| | |
|---|---|
| Wt. of dried Nafion ® film | 7.55 g. |
| Wt. of Nafion ® film soaked in 30% NMP, and dried | 7.79 (3% NMP) |
| Wt. of Nafion ® film soaked in water, and dried | 7.72 (2% NMP) |

The properties of the final film were:

| Permeation Rate | |
|---|---|
| $H_2O$ ($\times 10^{-4}$ mol/cm$^2$/min) | $7.08 \times 10^{-4}$ |
| $CH_3OH$ ($\times 10^{-5}$ mol/cm$^2$/min) | $1.55 \times 10^{-5}$ |
| Conductivity, S/cm | 0.077 |

Membranes prepared as described in Example 13 were tested for their performance in a fuel cell using the following procedures:

Catalyst Coated Membrane (CCM) Preparation Procedure:

The cathode catalyst dispersion was prepared in a Eiger® bead mill, manufactured by Eiger Machinery Inc., Grayslake, Ill. 60030, containing 80 ml 1.0-1.25 micron zirconia grinding media. 105 grams Platinum black catalyst powder (obtained from Colonial Metals, Elkton, Md.) and 336 grams of 3.5 wt % Nafion® solution (the polymer resin used in such a solution was typically of 930EW polymer and was in the sulfonyl fluoride form) were mixed and charged into the mill and dispersed for 2 hours. Material was withdrawn from the mill and particle size was measured. The ink was tested to ensure that the particle size was under 1-2 micron and the % solids in the range of 26%. The catalyst decal was prepared by drawing down the catalyst ink to a dimension of 5 cm×5 cm (to give a total area of 25 cm$^2$) on a 10 cm×10 cm piece of 3 mil thick Kapton® polyimide film manufactured by E.I. duPont de Nemours & Co., Wilmington, Del. A wet coating thickness of 5 mil (125 microns) typically resulted in a catalyst loading of 4 to 5 mg Pt/cm$^2$ in the final CCM. Anode decals were prepared using a procedure similar to that described above, except that in the catalyst dispersion, the Platinum black catalyst was replaced by a 1:1 atomic ratio Platinum/Ruthenium black catalyst powder (obtained from Johnson Mathey, NJ). The CCM was prepared by a decal transfer method. A piece of wet untreated Nafion® N117 membrane (4"×4") (10.16 cm×10.16 cm) in the H$^+$ form was used for CCM preparation. The membrane was sandwiched between an anode catalyst coated decal and a cathode catalyst coated decal. Care was taken to ensure that the coatings on the two decals were registered with each other and were positioned facing the membrane. The entire assembly was introduced between two pre-heated (to 145C) 8"×8" plates of a hydraulic press and the plates of the press were brought together without wasting much time until a pressure of 5000 lbs was reached. The sandwich assembly was kept under pressure for ~2 mins and then the press was cooled for ~2-3 mins (viz., till it reached a temperature of <60° C.) under the same pressure. Then the pressure was released under ambient conditions, and the assembly was removed from the press and the Kapton® films were slowly peeled off from the top of the membrane showing that the catalyst coating had been transferred to the membrane. The CCM was immersed in a tray of water (to ensure that the membrane was completely wet) and carefully transferred to a zipper bag for storage and future use.

A similar method was used to fabricate the CCMs using the treated membranes of the invention with the following exception: the treated membranes tested required a slightly higher temperature, e.g. 160° C., and a higher pressure, e.g. 7000 psi ($4.9 \times 10^6$ kg m$^{-2}$) for a complete decal transfer of the catalyst ink to the membrane.

Chemical Treatment of CCMs

The CCMs were chemically treated in order to convert the ionomer in the catalyst layer from the —SO$_2$F form to the proton —SO$_3$H form. This requires a hydrolysis treatment followed by an acid exchange procedure. The hydrolysis of the CCMs was carried out in a 20 wt % NaOH solution at 80° C. for 30 min. The CCM's were placed between Teflon® mesh, manufactured by DuPont, and placed in the solution. The solution was stirred to assure uniform hydrolyses. After 30 minutes in the bath, the CCM's were removed and rinsed completely with fresh deionized (DI) water to remove all the NaOH.

Acid exchange of the CCMs that were hydrolyzed in the previous step was done in 15 wt % Nitric Acid Solution at a bath temperature of 65° C. for 45 minutes. The solution was stirred to assure uniform acid exchange. This procedure was repeated in a second bath containing 15 wt % Nitric acid solution at 65° C. for another 45 minutes.

The CCMs were then rinsed in flowing DI water for 15 minutes at room temperature to ensure removal of all the residual acid and finally in a water bath at 65° C. for 30 minutes. They were then packaged wet and labeled. The CCM (10) comprised an untreated Nafion® 117 or treated Nafion® perfluorinated ion exchange membrane (11); and electrodes (12), prepared from a platinum/ruthenium black catalyst and Nafion® binder on the anode side, and a platinum black catalyst and Nafion® binder on the cathode side.

Example 19

The treated and untreated, 7 mil (177.8 microns) Nafion® membranes as shown in Table 5 were evaluated for fuel cell performance in a cell employing a membrane electrode assembly, 30, (MEA) of the type depicted in FIG. 1. A catalyst coated membrane, 10, (CCM) prepared as described above was loosely attached in a single cell hardware (purchased from Fuel Cell Technologies Inc., NM) with ELAT™ carbon cloths, 13, (GDB) purchased from E-Tek, Natick, Mass. In one embodiment, the single side microporous layer coated on the carbon cloth faced the Pt-Ru black electrode. In a second embodiment, the ELAT™ carbon cloths are double side coated with microporous layers, wherein one side is coated thicker than the other, the thicker coated side faced the Pt black electrode. The active area of the single cell hardware was 25 cm². Care was taken to ensure that the GDB covered the catalyst coated area on the CCM.

A glass fiber reinforced silicone rubber gasket (19) (Furan—Type 1007, obtained from Stockwell Rubber Company), cut to shape to cover the exposed area of the membrane of the CCM, was placed on either side of the CCM/GDB assembly, taking care to avoid overlapping of the GDB and the gasket material. The entire sandwich assembly was assembled between the anode and cathode flow field graphite plates (21) of a 25 cm² standard single cell assembly (obtained from Fuel Cell Technologies Inc., Los Alamos, N.Mex.). The single cell assembly shown in FIG. 1 was also equipped with anode inlet (14), anode outlet (15), cathode gas inlet (16), cathode gas outlet (17), aluminum end blocks (18), tied together with tie rods (not shown), electrically insulating layer (20), and gold plated current collectors (22). The bolts on the outer plates (not shown) of the single cell assembly were tightened with a torque wrench to a torque of 1.5 ft.lb (0.21 kgf m).

Figure 2:
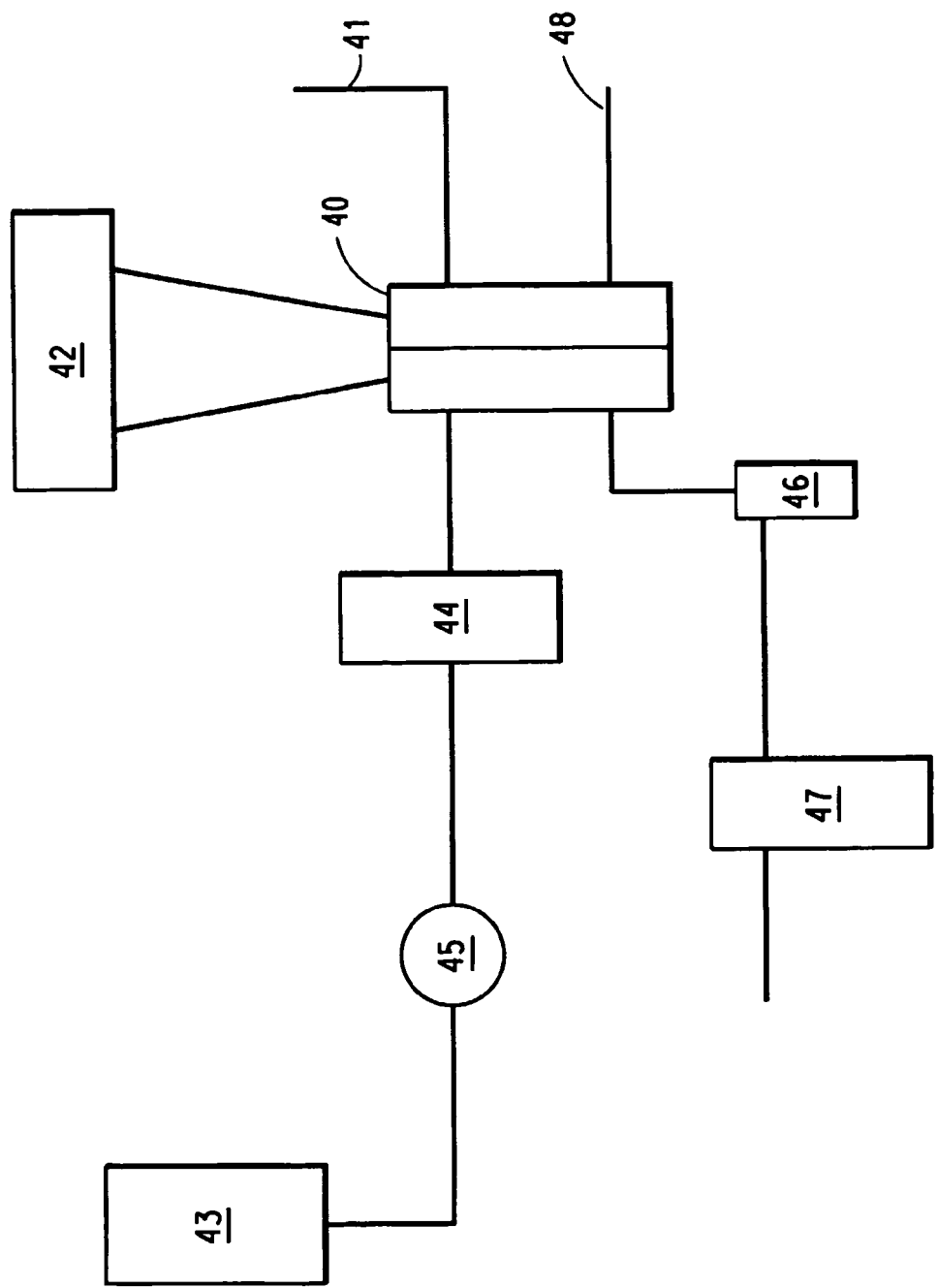
FIG. 2 is a schematic illustration of a typical DMFC test station.

The single cell assembly (40) was then connected to the fuel cell test station, a schematic illustration of which is shown in the FIG. 2. The components in a test station include a supply of air for use as cathode gas (41); a load box to regulate the power output from the fuel cell (42); a MeOH solution tank to hold the feed anolyte solution (43); a heater to pre-heat the MeOH solution before it enters the fuel cell (44); a liquid pump to feed the anolyte solution to the fuel cell at the desired flow rate (45); a condenser to cool the anolyte exit from the cell to room temperature (46), a collection bottle to collect the spent anolyte solution (47), and a vent (48) through which exhaust gases and water are removed.

With the cell at room temperature, 1M MeOH solution and air were introduced into the anode and cathode compartments respectively through inlets (14) and (16) of the cell at the rates of 5 cc/min and 500 cc/min respectively to the anode and cathode compartments. The temperature of the single cell was slowly raised till it reached 38° C. Typically, a current-voltage polarization curve was recorded. This comprised of recording the current output from the cell as the voltage was stepped down in 50 mV steps starting from the open circuit voltage (OCV) down to 0.15 V and back up to OCV. The voltage was held constant in each step for 20 seconds to allow for the current output from the cell to stabilize.

An aqueous solution of 1 M methanol was passed over the anode side and ambient pressure air at room temperature was passed over the cathode side. The cell was heated to 38° C. The current flowing across the cell which was a measure of the fuel cell performance was measured and recorded by scanning the potential from 0 volt to 0.8 V. The cell power density (W/cm²) is another performance measure, which was calculated from the equation, Power Density=Cell current density×Cell voltage.

TABLE 5

| Sample # | Membrane | Treatment Details | Conductivity (mS/cm) |
|---|---|---|---|
| 1 | Nafion ® N117 (control) | None | 100 |
| 2 | Sample 120-3, Example 13 | Nafion ® N117 membrane exposed to 1.17 g PVP in water/THF mixtures for ~2 hrs | 96 |
| 3 | Sample 130-6, Example 13 | Nafion ® N117 membrane exposed to 1.57 g PVP in water/THF mixtures for ~2 hrs. and further treated with NaOH and HNO$_3$ | 95 |

Figure 3:
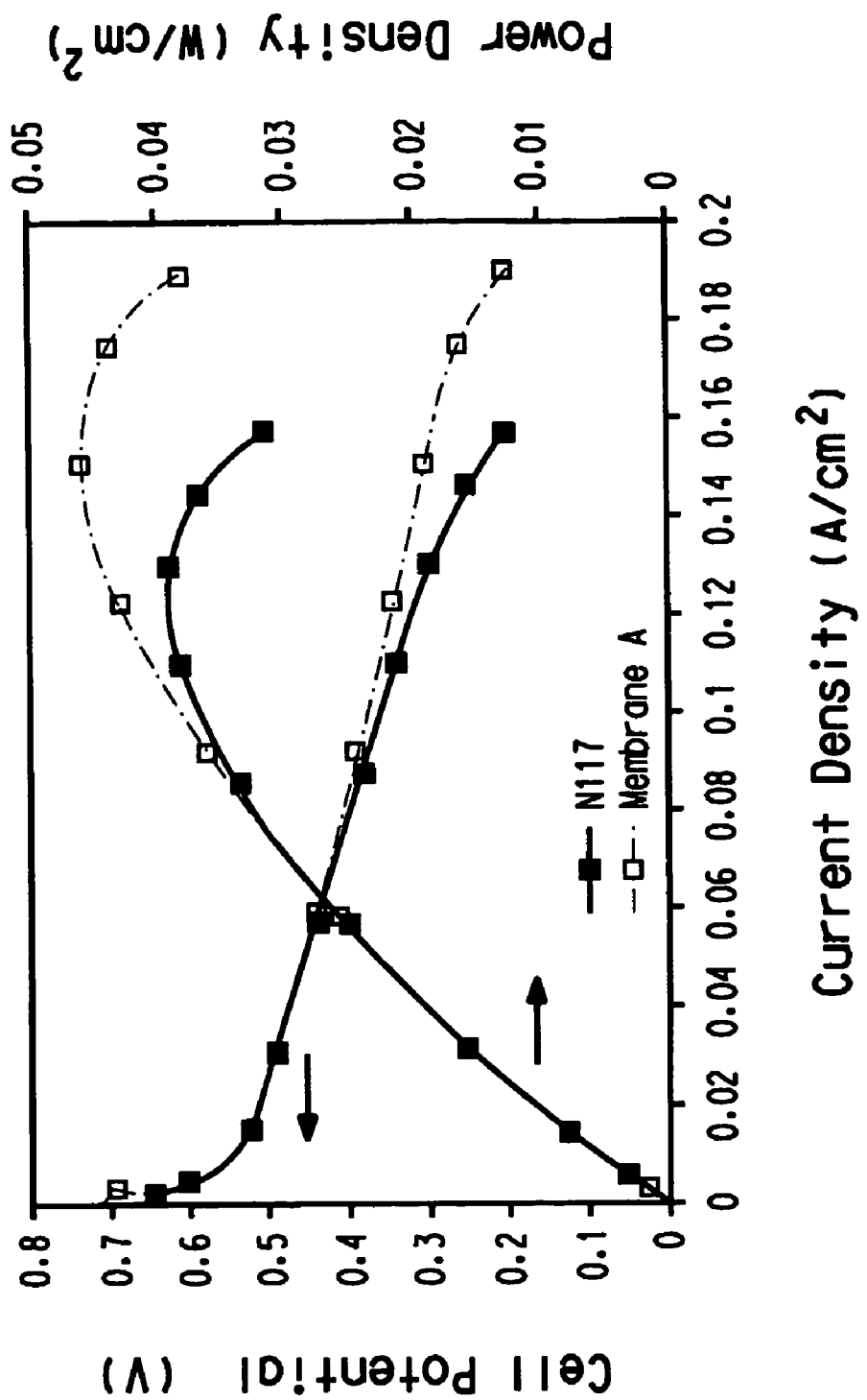
FIG. 3 is a graph showing the performance of a DMFC using Sample 120-3, Example 13 at an operating temperature of 38° C.
Figure 4:
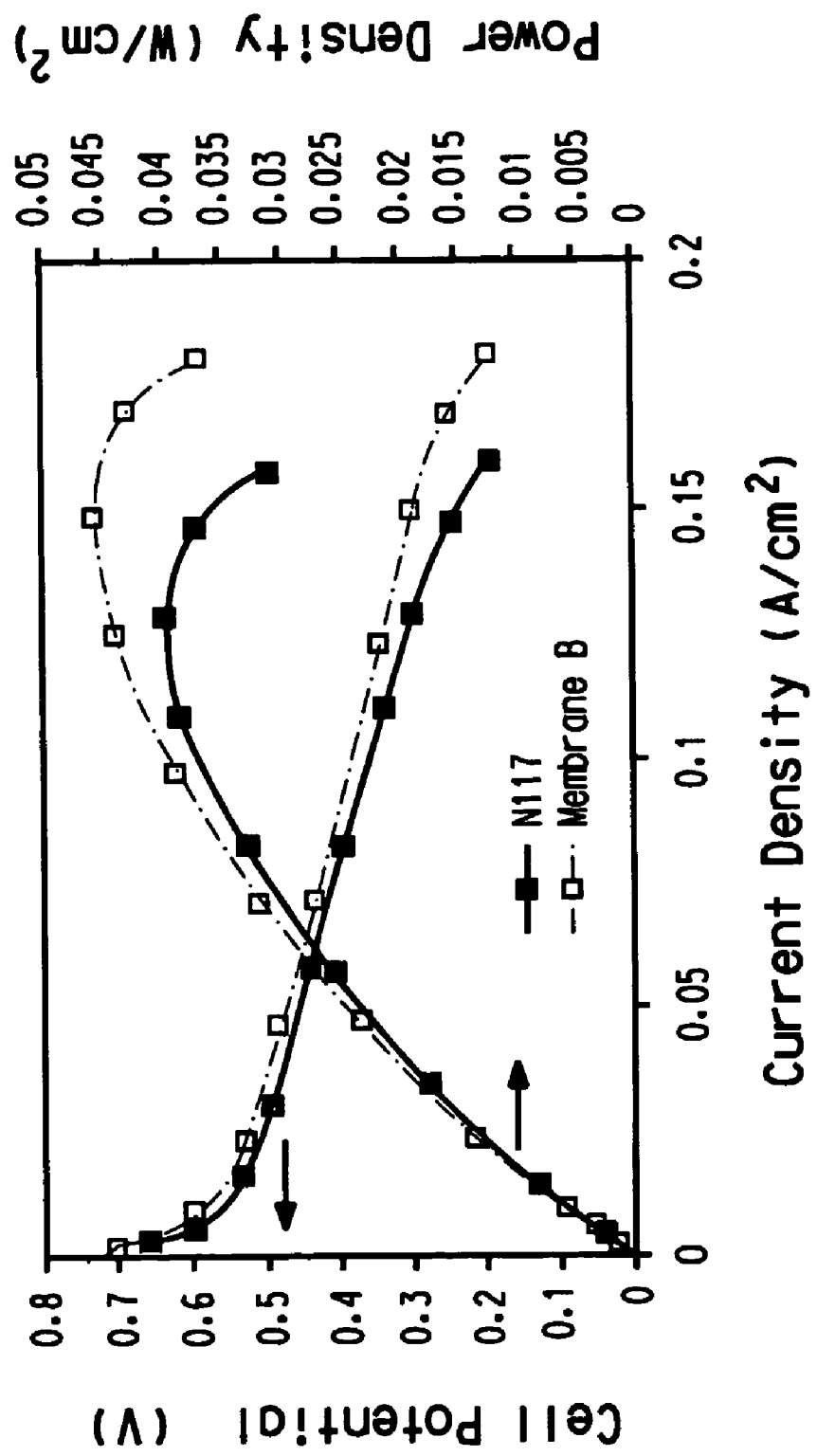
FIG. 4 is a graph showing the performance of a DMFC using Sample 130-6, Example 13 at an operating temperature of 38° C.

Results show that the power density for the treated Sample 120-3, Example 13 and Sample 130-6, Example 13 at 0.3V is ~15% higher than the untreated commercial Nafion® N117 membrane. The data is shown in FIGS. 3 and 4.

Example 20

Methanol Cross-Over Determination

The same membrane electrode assemblies with Samples 120-3 and 130-6, Example 13, used in the previous examples, were used for the methanol crossover measurements. An electrochemical method, as described by Xiaoming Ren et al in "Proceeding of Proton Conducting Membrane Fuel Cells I" eds. Shimshon Gottesfeld, Gerald Halpert and Albert Landgrebe, pp 284-298, was followed to determine the methanol crossover rate. Instead of air as mentioned in fuel cell measurements, an inert nitrogen gas was fed (500 cc/min) through the cathode side. The anode was fed with 1M methanol feed, and the cell was heated to 38° C. Once the cell temperature was stabilized to 38° C., the cell was driven from 0.2V to 0.8V with 0.05V increments using a power supply (Model #Zup6-66, Lambda Electronics, Calif. (USA) in conjunction with the fuel cell assembly described previously. The current measured at each voltage steps was recorded and limiting current determined from the current vs. voltage curve, typically at ~0.8 V was attributed to methanol crossover rate for the membrane used. The methanol crossover data thus determined is shown in Table 6.

TABLE 6

| Temp. (°C.) | MeOH Concn. (M) | Methanol Crossover (mA/cm$^2$) | | |
| --- | --- | --- | --- | --- |
| | | Control | Sample 120-3, Example 13 | Sample 130-6, Example 13 |
| 38 | 1 | 55 | 36 | 44 |

It was observed that the methanol crossover rate for the samples 120-3 and 130-6, Example 13, was lower than the neat commercial Nafion®N117 membrane and reduced by 34 and 20% respectively vs. 2M methanol Nafion N117 using a 1M Methanol feed.

Example 21

Example 20 was repeated with the following exception: Methanol having a 2M concentration was used instead of the 1M methanol. The crossover rate obtained is shown in Table 7.

TABLE 7

| Temp. (°C.) | MeOH Concn. (M) | Methanol Crossover (mA/cm$^2$) | | |
| --- | --- | --- | --- | --- |
| | | Control | Sample 120-3, Example 13 | Sample 130-6, Example 13 |
| 38 | 2 | 101 | 61 | 77 |

The methanol crossover rate was reduced by 39% and 23%, respectively, for Samples 120-3 and 130-6, Example 13 compared to the commercial Nafion® N117 membrane.

What is claimed is:

1. A solid polymer electrolyte membrane comprising a fluorinated ionomer having imbibed therein a non-fluorinated, non-ionomeric polymer, wherein the fluorinated ionomer comprises at least 6 mole % of monomer units having a fluorinated pendant group with a terminal ionic group, and wherein the non-fluorinated, non-ionomeric polymer is polyvinylpyrrolidone, and derivatives thereof.

2. The solid polymer electrolyte membrane of claim 1 wherein the fluorinated pendant group is the radical represented by the formula;

$$-(OCF_2CFR)_aOCF_2(CFR')_bSO_2X^-(H^+)[YZ_c]_d \quad (I)$$

wherein R and R' are independently selected from F, Cl or a perfluoroalkyl group having 1 to 10 carbon atoms, optionally substituted by one or more ether oxygens;
a=0, 1 or 2;
b=0 to 6;
X is O, C or N with the proviso that d=0 when X is O and d=1 otherwise, and c=1 when X is C and c=0 when X is N;
when c=1, Y and Z are electron-withdrawing groups selected from the group consisting of CN, SO$_2$R$_f$, SO$_2$R$^3$, P(O)(OR$^3$)$_2$, CO$_2$R$^3$, P(O)R$^3{}_2$, C(O)R$_f$, C(O)R$^3$, and cycloalkenyl groups formed therewith wherein R$_f$ is a perfluoroalkyl group of 1-10 carbons optionally containing one or more ether oxygens; R$^3$ is an alkyl group of 1-6 carbons optionally substituted with one or more ether oxygens, or an aryl group optionally further substituted;
or, when c=0, Y may be an electron-withdrawing group represented by the formula —SO$_2$R$_f'$ where R$_f'$ is the radical represented by the formula;

$$-(R_f''SO_2N^-(H^+)SO_2)_mR_f'''$$

where m=0 or 1, and R$_f''$ is —C$_n$F$_{2n}$— and R$_f'''$ is —C$_n$F$_{2n+1}$ where n=1-10.

3. The solid polymer electrolyte membrane of claim 2 wherein the pendant group is a radical represented by the formula;

—OCF$_2$CF(CF$_3$)—OCF$_2$CF$_2$SO$_3$H.

4. The solid polymer electrolyte membrane of claim 2 wherein the pendant group is a radical represented by the formula;

—OCF$_2$CF$_2$—SO$_3$H.

5. The solid polymer electrolyte membrane of claim 1 wherein the fluorinated ionomer is polyfluorinated.

6. The solid polymer electrolyte membrane of claim 1 wherein the non-fluorinated, non-ionomeric polymer is present in the amount of at least about 0.2% by weight, based on the weight of the solid polymer electrolyte membrane.

7. The solid polymer electrolyte membrane of claim 6 wherein the non-fluorinated, non-ionomeric polymer is present in the amount of at least about 1% by weight, based on the weight of the solid polymer electrolyte membrane.

8. A solid polymer electrolyte membrane comprising a fluorinated ionomer having imbibed therein a non-fluorinated, non-ionomeric polymer, wherein the fluorinated ionomer comprises a highly fluorinated carbon backbone having at least 6 mole % of monomer units having a fluorinated pendant group with a terminal ionic group, wherein the non-fluorinated, non-ionomeric polymer is present in the amount of about 0.2% to about 10% by weight, based on the weight of the solid polymer electrolyte membrane, and is polyvinylpyrrolidone, and derivatives thereof.

9. The solid polymer electrolyte membrane of claim 8 wherein the conductivity of the membrane is at least 72 milliS/cm.

* * * * *